April 16, 1968  E. KELLERHALS  3,377,748
SWINGING DOORS
Filed April 28, 1966
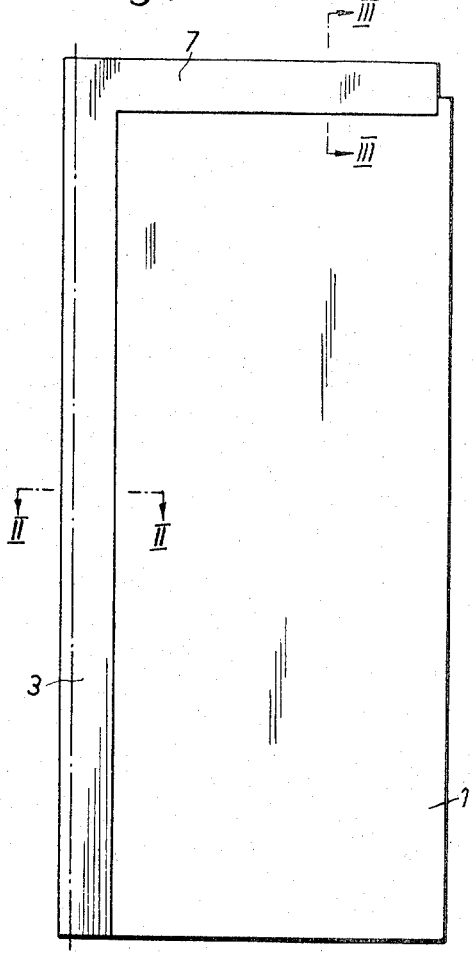
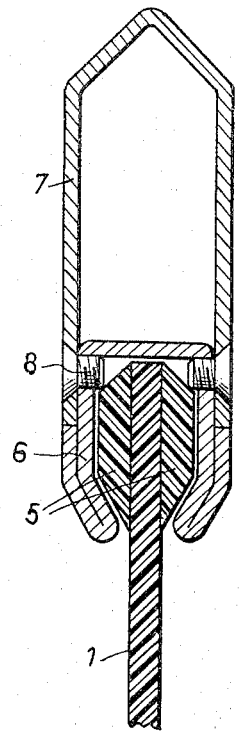
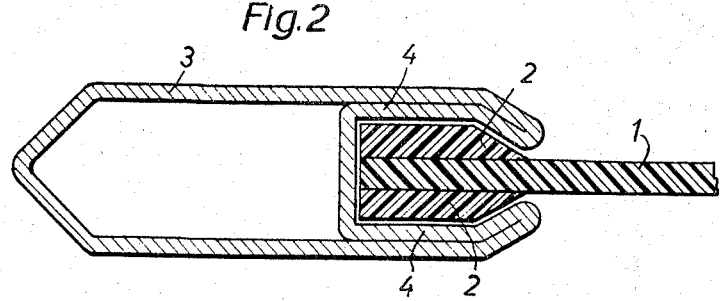
INVENTOR.
ERWIN KELLERHALS
BY
attorney

United States Patent Office 3,377,748
Patented Apr. 16, 1968

3,377,748
SWINGING DOORS
Erwin Kellerhals, Schaffhausen, Switzerland, assignor to Carl Sigerist & Cie., Schaffhausen, Switzerland
Filed Apr. 28, 1966, Ser. No. 545,976
Claims priority, application Switzerland, Apr. 30, 1965, 6,050/65
10 Claims. (Cl. 49—501)

ABSTRACT OF THE DISCLOSURE

A swinging door with a support having a vertical groove or both vertical and horizontal grooves wherein is supported a vertical or a horizontal edge respectively of a panel of plastic subject to tensile creep. An edge support is bonded to the panel and fits within the groove of the support.

---

The present application relates to a swinging door, in which a vertical door panel of synthetic plastic is provided. This door panel must be held at least on one vertical edge in a metallic mounting. Hitherto the panel has been clamped by clamping parts of the mounting. The clamping parts are pressed together by clamping screws. As, however, the heavy panel of plastic is subjected by its own weight to cold flow or yielding, the panel is stressed at the clamping points and can be deformed or the clamping screws can be torn out. To overcome these difficulties the plastic panel is held according to the present invention at least along one vertical edge in such manner that it can move in vertical direction. For this purpose the said edge of the panel is provided with a guiding strip on one or both sides of the edge. This guiding strip consists preferably of the same plastic material as the panel and is bonded to it. The edge with the guiding strip or strips is inserted in a slot of a metallic support in such a manner that the edge can move in longitudinal sense. Therefore the panel is here at the points of securing not subjected to stresses due to cold flow or yielding.

An object of the invention is a door panel and frame combination that secures the panel on the one hand and that permits tensile creep on the other hand.

These and other objects of the invention will be apparent from the following detailed description and the accompanying drawings, wherein:

FIGURE 1 is a front view of the door of the invention; and

FIGURES 2 and 3 are sectional views along lines II—II and III—III, respectively.

The panel 1 of the swinging door is made of a completely transparent synthetic plastic. A support 2, advantageously made of the same synthetic plastic as the panel 1, is bonded by cementing or welding to each side of the panel along its vertical supporting edge. A vertical frame member 3 integrally forms at 4 a mounting in the form of a slot that slidably receives the supports 2. Frame 3 is mounted on door frame (not shown).

Referring to FIGURE 3, two supports 5 are secured to the upper supporting edge of panel 1. The slot mounting 6 for the supports 5 is constructed as a separate member that is secured to the horizontal frame member 7 by screws 8.

The invention comprises both the case where only the vertical edge of the panel is supported in accordance with the invention and the case where both the vertical edge and the upper panel edges are supported in accordance with the invention. It is also within the purview of the invention to have only a single support 2 and, as the case may be, support 5, located on one side of the panel.

With at least the vertical edge so supported, the supports 2 and, as the case may be, the supports 5 are free to move in the mounting 4 and, as the case may be, in the mounting 6, should tensile creep occur.

I claim:

1. In a swinging door, the combination comprising:
   a substantially vertical door panel of synthetic plastic;
   a first frame for supporting the door for movement located along a vertical edge of said panel;
   at least one support located along said edge on one side of said panel and bonded thereto;
   a mounting associated with said first frame for receiving and holding said edge and support against movement transverse to said edge but permitting movement to the edge along said edge and at least in the downward sense;
   said panel defining a lower horizontal edge that is free for movement transverse to said lower horizontal edge;
   a second frame located along the upper horizontal edge of said panel, and intersecting said first frame;
   at least one support located along said upper horizontal edge on one side of said panel and bonded thereto; and
   a mounting associated with said second frame located along the upper horizontal edge for receiving and holding said upper horizontal edge and support along said upper horizontal edge against movement transverse to the edge but permitting movement thereto along the edge and at least in the sense directed away from said vertical edge.

2. In a swinging door according to claim 1, wherein there are two supports located along said vertical edge and on either side of said panel.

3. In a swinging door according to claim 1, wherein said support along said vertical edge extends substantially along the entire length of said vertical edge.

4. In a swinging door according to claim 1, wherein said support along said vertical edge and panel are made of the same material.

5. In a swinging door according to claim 1, wherein each of said mountings defines a slot having a longitudinal opening that is wider than said panel but narrower than the thickness of the panel and support together, the interior of said slot being sufficiently large in cross section to accept the panel and support.

6. In a swinging door according to claim 1, wherein each of said mountings is integral with said frame.

7. In a swinging door according to claim 1, wherein there are two supports located along each of said vertical and upper horizontal edges and on both sides of the panel.

8. In a swinging door according to claim 7, wherein each of said mountings defines a slot having a longitudinal opening that is wider than said panel but narrower than the thickness of the panel and supports together, the interior of said slot being sufficiently large in cross section to accept the panel and supports.

9. In a swinging door according to claim 8, wherein said supports and panel are made of the same material.

10. In a swinging door according to claim 9, wherein said panel comprises at least the major portion of the area of the door.

References Cited

UNITED STATES PATENTS

| 1,510,474 | 10/1924 | Garner et al. | 160—354 |
| 2,827,117 | 3/1958 | Bateman | 160—354 |

FOREIGN PATENTS

| 835,827 | 5/1960 | Great Britain. |

KENNETH DOWNEY, *Primary Examiner.*